United States Patent [19]
Horowitz et al.

[11] 3,773,365
[45] Nov. 20, 1973

[54] ANTI-LOCK BRAKE SYSTEM

[75] Inventors: Charles Horowitz, Niles; Sergio Campanini, Lincolnwood, both of Ill.

[73] Assignee: The Berg Manufacturing Company, Des Plaines, Ill.

[22] Filed: May 8, 1972

[21] Appl. No.: 251,320

[52] U.S. Cl. ............................................ 303/21 CH
[51] Int. Cl. .............................................. B60t 8/06
[58] Field of Search .................. 303/21 CH, 21 AF; 188/181 T, 181 TX, 346

[56] References Cited
UNITED STATES PATENTS

| | | | |
|---|---|---|---|
| 3,008,548 | 11/1961 | Moyer | 303/21 CH |
| 2,226,557 | 12/1940 | Eksergian | 303/21 CH |
| 3,031,039 | 4/1962 | Goodwin | 188/181 T |
| 3,689,121 | 9/1972 | Kawabe | 303/21 CH |

*Primary Examiner*—Lloyd L. King
*Attorney*—Howard T. Markey et al.

[57] ABSTRACT

A brake system in which a valve is responsive to excess torque sensed in an anti-lock device to deliver fluid pressure to the emergency brake actuators to reduce the braking pressure thereof and thus to prevent wheel lock-up.

1 Claim, 2 Drawing Figures

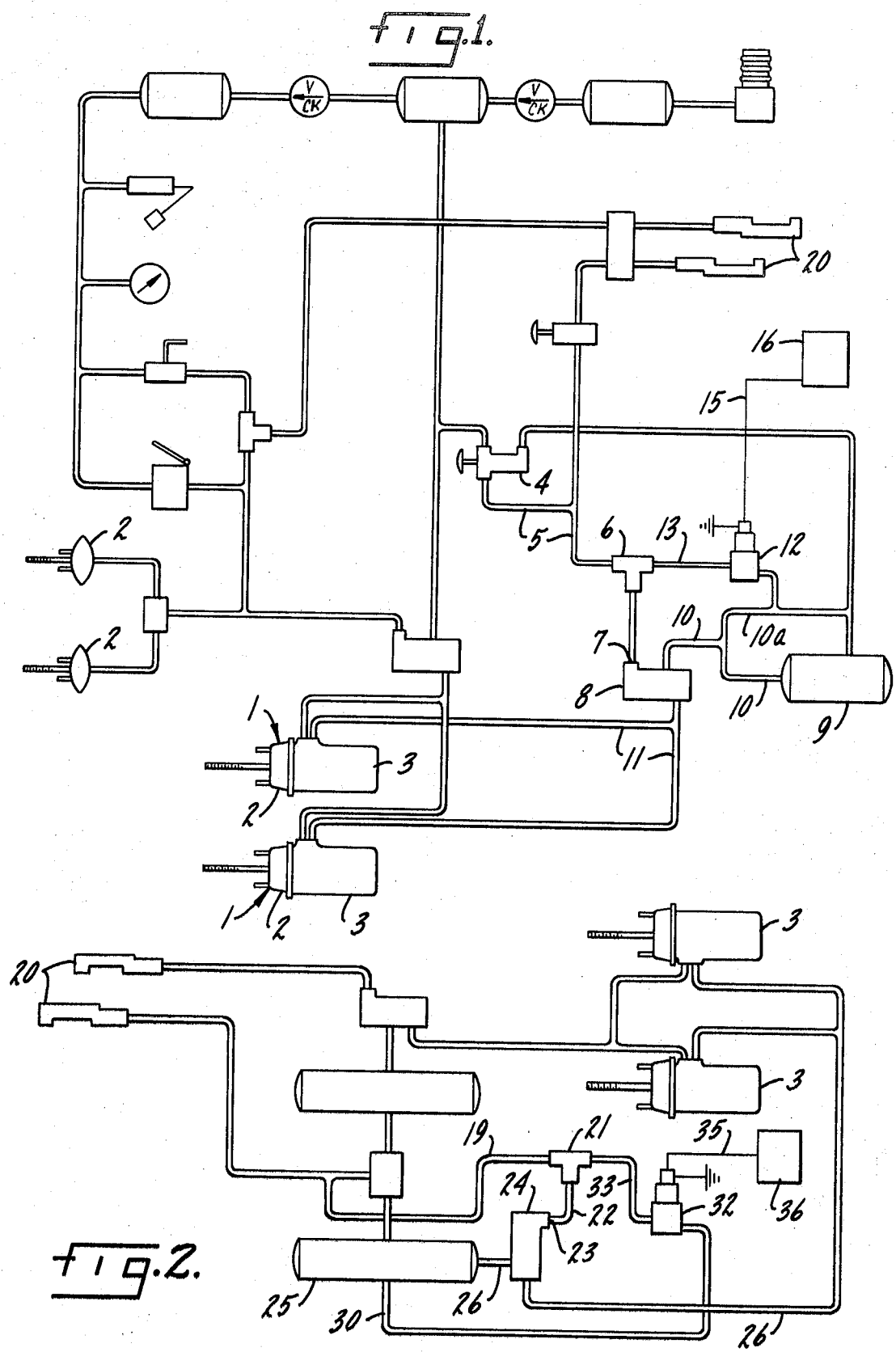

ANTI-LOCK BRAKE SYSTEM

SUMMARY OF THE INVENTION

This invention relates to tractor-trailer vehicle brake systems and particularly to such systems employing spring-applied, fluid-pressure released emergency brake actuators and anti-lock systems.

One purpose of the invention is to provide means assuring against lock-up of the vehicle wheels when the brakes are applied by the emergency brake actuators of the system.

Another purpose is to provide an anti-lock vehicle brake system for tractor-trailer vehicles effective to prevent wheel lock-up when the brakes are applied by emergency actuators on the tractor and on the trailer. The prevention of wheel lock-up is important in increasing the vehicle stability and controllability during a braking action. Limiting the maximum spring force in an emergency brake actuator of the type described to reduce the system's tendency toward locked wheels is inadequate because a tendency to lock wheels remains when the vehicle is unloaded and on a slippery road and full utilization of the emergency vehicle brakes is rendered unavailable to a fully loaded vehicle on dry roads.

Accordingly, it is another purpose of the present invention to permit optimum utilization of the spring forces of the emergency vehicle brakes on all types of road surfaces and with all vehicle loadings and braking conditions by means of a brake system employing an automatic modulation of the spring forces in emergency brake actuators.

Concern exists in relation to automatically operating the full force of emergency brakes because of the accident potential in the tendency to lock wheels. Requiring vehicle operator modulation of the application of the emergency brakes retains the accident potential inherent in human error and delay. Accordingly, it is another purpose of the invention to provide a means of avoiding wheel lock-up in emergency brake operation and enabling the retention of the safety advantage in automatic response of the emergency brake.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a schematic illustration of a tractor brake system; and

FIG. 2 is a schematic illustration of a trailer brake system.

Like parts are indicated by like numerals throughout the specification and drawings.

DESCRIPTION OF THE PREFERRED EMBODIMENT

Referring now to the drawings, it will be understood that sufficient portions of the brake system are shown and described to provide full disclosure of the invention, those portions of the system known to those skilled in the art not being described in detail in the interest of clarity and ease of understanding.

Referring to FIG. 1, for example, the numeral 1 generally designates brake actuators. Normal or service brake actuating chambers are indicated at 2. Indicated at 3 are spring-applied, fluid pressure released emergency brake actuators having fluid pressure and spring chambers therein on opposite sides of a movable wall. The actuators 1 and service and emergency chambers 2, 3 are of well known construction, such as that shown for example in U. S. letters Pat. No. 3,581,627. Since the normal or service brake actuating system may be of standard construction and not directly related to the invention herein, the same will not be further described.

Indicated at 4 is a conventional dash control valve delivering fluid pressure, when activated, through conduit 5 and one side of a conventional two-way check valve 6 to the servo or input port 7 of a secondary relay valve 8. The valves 4 and 8 may, for example, take the form illustrated in U. S. letters Pat. No. 3,096,789 and 3,411,836, respectively.

Fluid pressure from a source 9 is delivered through a conduit 10 to the valve 8 and, when valve 8 is opened by fluid pressure delivered at 7, the fluid pressure from source 9 will be delivered through conduit 11 to the fluid pressure side of the movable wall within chambers 3 to compress the springs therein and reduce the braking force of said springs.

A branch 10a of conduit 10 delivers fluid pressure from source 9 to an electrically operated valve, such as the solenoid operated valve 12 for example. The valve 12 may take a variety of forms well known in the art, it being understood that the valve 12 is a two-position valve. The normal position of the valve 12, to which it may be yieldingly urged, is one effective to close communication with source 9 and exhaust to atmosphere port 7 of valve 8 through the opposite side of two-way check valve 6 and conduit 13. While elements 6, 8 and 12 are for clarity shown separated, it will be realized that the same could be located in a single housing without departing from the nature and scope of the invention.

Indicated at 15 is an electrical conductor connected to solenoid valve 12. It will be understood that the conductor 15 is connected also to the anti-lock system illustrated schematically at 16. Such systems are well known in the art and while they may take a variety of conventional forms, the anti-lock system 16 generates an electrical signal in response to excessive torque sensed in the anti-lock system. Said signal is thus delivered through conductor 15 to valve 12.

Referring now to FIG. 2, in which a trailer braking system is schematically illustrated, the gladhand connectors 20 deliver fluid pressure from the tractor system in the conventional manner. One of said connectors delivers fluid pressure to one side of a two-way check valve 21 from which said fluid pressure flows through conduit 22 to the servo or input port 23 of a secondary relay valve 24. A source of fluid pressure 25 carried on the trailer delivers fluid pressure by means of conduit 26 through the valve 24 when the same is opened in response to pressure delivered at 23 and to the emergency chambers 3 to retract or compress the brake-operating springs therein.

A fluid pressure conduit 30 delivers fluid pressure from source 25 to an electrically operated or solenoid valve 32 corresponding to the valve 12 on the tractor as illustrated in FIG. 1. The valve 32 has a normal position exhausting the opposite side of two-way check valve 21 to atmosphere through the conduit 33 and valve 32, the valve 32 in said position closing conduit 30 from source 25. An electrical conductor 35 delivers an electrical signal to the valve 32 in response to the generation of excessive torque sensed in the anti-lock system 36 as above described with respect to FIG. 1. Delivery of such signal moves valve 32 into its second position communicating the fluid pressure source 25 with said opposite end of check valve 21 through conduits 30 and 33 and thus supplies fluid pressure from source 25 through conduit 22 to the input port 23 of relay valve 24 to open valve 24 and thus to deliver fluid pressure from source 25 to the chambers 3 and thus to reduce the braking forces of the springs therein.

The use and operation of the invention are as follows:

The emergency brake actuators 3 may be activated by diminution of the fluid pressure thereof through the mediacy of a foot application valve or other valve such as dash control valve 4 by the operator or automatically in response to loss of fluid pressure in the brake system.

When the dash controlled valve 4 is employed and is moved to exhaust position, fluid pressure is removed from port 7 and thus from above the actuating piston or control element in valve 8, as is well known, through valve 6, conduit 5 and valve 4. Thereupon the fluid pressure in the chambers 3 is exhausted through the relay valve 8 to atmosphere and the springs within the chambers 3 apply the brakes. The vehicle operator may thus manipulate valve 4 to park the vehicle or to apply the brakes under emergency conditions. When exhaust of chambers 3 is accomplished manually through other means, valve 4 may still be supplied as a parking brake applicator. The same application of brakes through the mediacy of the springs in chambers 3 may occur automatically in response to loss of fluid pressure in the system.

In any prior application of the vehicle brakes by means of the emergency actuators 3, application of the full braking force of the springs therein may result in a lock-up of the wheels of the tractor or trailer vehicle. The provision of an anti-lock system 16, 36 would not preclude such wheel lock-up under emergency braking conditions in the absence of the present invention. Accordingly, a relay valve 8,24 is provided and a source of fluid pressure is communicated through the opposite side of a two-way check valve 6,21, and thus to the relay valve to open it, by means of an electrically operated valve 12,32. With the dash control valve 4 and conduit 5,19 exhausted, fluid pressure delivered from source 9,25 through valve 12,32 will move the check valve element in valve 6,21 to close the conduit 5,19 and to deliver fluid pressure from conduit 13,33 through valve 6,21 to input port 7,23 of valve 8,24 and thus open valve 8,24 to supply fluid pressure from the source 9,25 to the emergency brake actuators to modulate or reduce the effect of the springs in the chambers 3. The valve 12,32 is moved electrically to said position in response to excess torque sensed in the anti-lock system 16,36 as a wheel lock-up condition is approached. Said electrical signal is delivered to valve 12,32 through conductor 15,35. In the absence of an electrical signal delivered to conductor 15,35, the valve 12,32 moves to a position exhausting said opposite end of valve 6,21 and port 7,23 to atmosphere and closing conduit 10a against loss of pressure from source 9.

We claim:

1. An anti-lock vehicle brake system including spring applied-fluid pressure released emergency brake actuators, a source of fluid pressure, an anti-lock mechanism generating electrical signals in response to excess torque sensed therein, an electrically operated valve controlling communication between said source and said actuators and a conductor connected to said mechanism and valve and effective to transmit said signals to said valve to direct fluid pressure from said source to said actuators, a relay valve controlling direct communication between said source and actuators, a control element in said relay valve, said electrically operated valve being communicable with atmosphere to exhaust said control element and close said relay valve against communication of said source with said actuators, a two-way check valve between said electrically operated and relay valves, said electrically operated valve communicating with one inlet of said check valve, said control element of said relay valve communicating with the outlet of said check valve, a second source of fluid pressure and control valve means controlling communication of said second source with the opposite inlet of said check valve.

* * * * *